May 26, 1959 F. DÖRING 2,888,521

TELEPHONE SET

Filed May 16, 1955 2 Sheets-Sheet 1

Inventor:
Fritz Döring
By [signature] Atty.

May 26, 1959 F. DÖRING 2,888,521

TELEPHONE SET

Filed May 16, 1955 2 Sheets-Sheet 2

Inventor:
Fritz Döring
By [signature] Atty.

United States Patent Office 2,888,521
Patented May 26, 1959

2,888,521

TELEPHONE SET

Fritz Döring, Berlin-Frohnau, Germany, assignor to Siemens & Halske Aktiengesellschaft, Munich and Berlin, Germany, a corporation of Germany Application May 16, 1955, Serial No. 508,380
In Germany June 23, 1949

Public Law 619, August 23, 1954
Patent expires June 23, 1969

4 Claims. (Cl. 179—100)

This invention relates to a telephone set with number selector comprising a rotatable operating member having finger holes formed therein for each of the numerals 0 to 9 for rotating the operating member for the purpose of winding up an associated mechanism so as to produce upon unwinding a number of current impulses and interruptions corresponding to the numeral associated with the finger hole employed in setting or rotating the operating member.

In conventional telephone sets, the operating member of the number selector is made in the form of a flat disk or dial which is rotatable about an axis perpendicular to its surface, with finger holes arranged thereon along a peripheral arc. The position of the axis is generally so selected that the user faces the dial substantially at a right angle to the surface thereof.

The above-indicated known dials which have been in general use for many years have various shortcomings. For instance, upon dialing, a spring is wound up so as to operate means for actuating impulse contacts the desired rate of speed. Forces are thereby produced acting in part laterally, making it necessary in the case of portable sets (which are the type most generally used) to make the instrument so heavy that it will not move during the dialing. The development of communication techniques has led to constantly smaller and lighter structural elements with a resultant saving of material, but the utilization of these advances in the art has been greatly impeded since a certain resistance to displacement of the instrument is necessary for the dialing.

However, there are also disadvantages in connection with the actuation of dials, particularly in those cases where frequent dialing is necessary. On the one hand, the circular or arcuate path which the finger must travel upon dialing prevents the attainment of high speeds. On the other hand, the edges of the finger holes when the dial is wound up slide past the finger tip with pressure which in case of very frequent repetition may be troublesome to the user.

There have been developed, therefore, for the use of operators in telephone exchanges so-called "straight-pull number selectors," that is, selectors the operating member of which is developed in the form of a slightly arched rail and the finger holes of which are located alongside each other in two vertical rows. These number selectors are, however, not suitable for use in telephone sets due to the large amount of space they take up, particularly in a vertical direction.

The present invention makes it possible to equip telephone sets with the advantages of the "straight-pull number selector," thereby improving the number selecting or dialing operation, and in addition to save a considerable amount of material, since the possibility of effecting the number selection no longer depends on the instrument not moving.

In accordance with the present invention, this result is achieved by the provision of a generally drum-shaped operating member having finger holes formed on a part of its periphery facing the user, and being rotatable about an axis parallel to the supporting surface of the set, whether it is a desk or a wall set. The operating parts of the number selector (spring, centrifugal governor, impulse contacts, etc.) are arranged in the space enclosed by the operating member.

It has been found advantageous to select the diameter of the operating member so that the greatest angle of rotation is in the order of about 100 to 120°. The finger holes are for this purpose in a known manner suitably arranged alongside of each other in at least two rows.

An embodiment of the invention will now be described with reference to the accompanying drawings showing in diagrammatic manner a desk set. In the drawings, Fig. 1 shows the new telephone set in front view;

Figure 1:
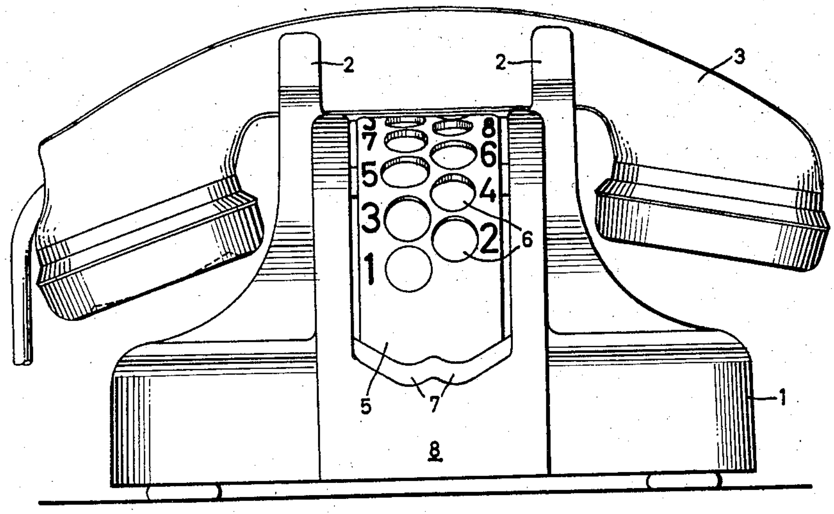
Figure 2:
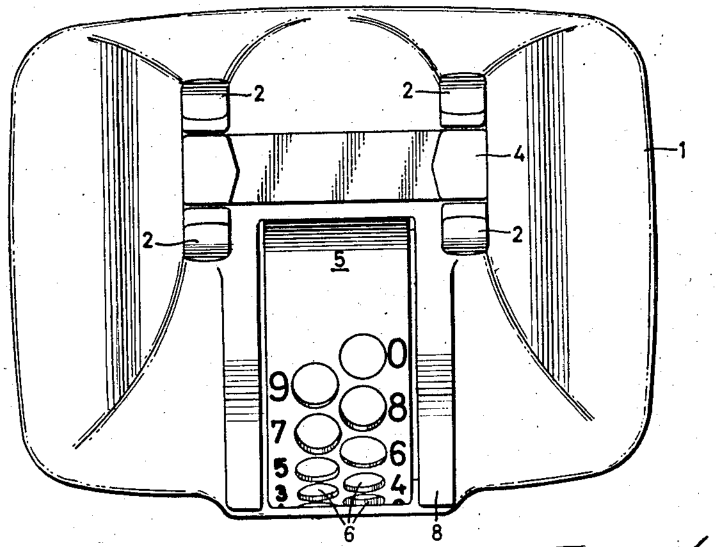
Fig. 2 shows a top view of the set.
Figure 3:
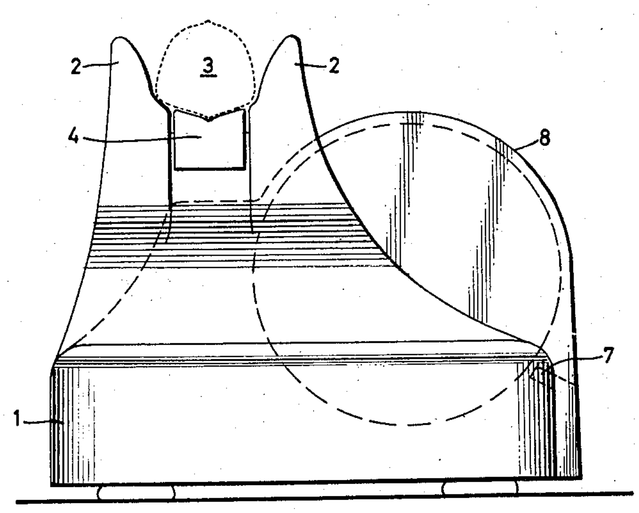
Fig. 3 shows a side view of the set.

The hand set is indicated in Fig. 1 in elevation and in dotted lines in Fig. 3, but has been omitted from Fig. 2.

The housing 1 is provided with four upward extending projections 2 which serve as tines, for the hand set 3. Between these tines there is arranged a movable part 4 for actuating the switch hook contacts.

The number or digit selector is arranged in a recess in the arcuately shaped front wall 8 of the housing 1. Its drum-shaped operating member is indicated at 5 and formed thereon are the finger holes 6 which are arranged in two rows over about one-fourth of its periphery. The finger holes 6 may be circular or oval. The operating member is rotatable about an axis which extends parallel to the supporting surface of the set.

The edge of the housing forms at 7 a finger stop. A special finger stop may however be provided to carry out adjustments of parts before assembling the number selector with the parts of the telephone set.

As will be apparent from the drawings, upon dialing, there will be produced substantially only forces which are directed at right angles to the supporting surface or at least components of such forces, so that the telephone set can be made light-weight without causing displacement thereof during the dialing operation.

The mechanical parts of the number selector may be made in the manner usually customary in connection with known dials. The corresponding parts may be arranged in the space enclosed by the operating member 5.

Depressions or recesses may be formed in the arcuate or cylindrical wall of the operating member to take the place of the finger holes.

Changes may be made within the scope and spirit of the appended claims.

I claim:

1. A telephone set comprising a housing formed with a window, a base for positioning the telephone set upon a supporting surface and a drum-shaped operating member operatively mounted within the housing, said drum-shaped operating member providing a number selector, said number selector comprising a forwardly directed arcuate wall forming a part of the drum-shaped operating member, finger holes formed in said forwardly directed arcuate wall, said arcuate wall extending within an angular range substantially within 100° to 120° and contiguous to and visible through said window of the housing of the telephone set, the remainder of said drum-shaped operating member being disposed within the set, said drum-shaped operating member providing a chamber adapted for receiving operating elements of the number selector, and said drum-shaped operating member journaled about an axis parallel to the base, whereby said axis is parallel to the supporting surface upon which the base of the telephone set is positioned.

2. A telephone set according to claim 1, wherein said housing forms an arcuately shaped front wall, and said drum-shaped operating member being disposed in said front wall.

3. A telephone set according to claim 1, wherein said housing forms an arcuately shaped front wall, a recess formed in said front wall providing the window, said drum-shaped operating member being disposed in said recess, said finger holes formed in two vertical rows, and the lower edge of said recess forming a finger stop for each of said rows.

4. A telephone set according to claim 1, wherein said housing forms an arcuately shaped front wall, a recess in said front wall providing the window, said drum-shaped operating member being disposed in said recess, and means disposed at the lower edge of said recess forming a finger stop for said finger holes.

References Cited in the file of this patent

UNITED STATES PATENTS

| | | |
|---|---|---|
| 2,502,440 | Deakin | Apr. 4, 1950 |
| 2,635,230 | Madden | Apr. 14, 1953 |

FOREIGN PATENTS

| | | |
|---|---|---|
| 366,408 | Great Britain | Feb. 4, 1932 |